United States Patent [19]
Gutierrez-Collazo

[11] Patent Number: 5,562,821
[45] Date of Patent: Oct. 8, 1996

[54] FOAM FRACTIONATOR

[75] Inventor: Santiago Gutierrez-Collazo, Guaynabo, Puerto Rico

[73] Assignee: Commonwealth of Puerto Rico, San Juan, Puerto Rico

[21] Appl. No.: 505,664

[22] Filed: Jul. 21, 1995

[51] Int. Cl.[6] .................................................. C02F 1/24
[52] U.S. Cl. ........................ 210/169; 210/219; 210/221.1; 261/93; 119/263; 119/264
[58] Field of Search ...................................... 210/169, 219, 210/221.1, 416.2; 261/93; 119/263, 264

[56] References Cited

U.S. PATENT DOCUMENTS

| | | |
|---|---|---|
| 3,491,880 | 1/1970 | Reck . |
| 3,567,021 | 3/1971 | Morisseau, Jr. . |
| 3,590,558 | 7/1971 | Fernandes . |
| 3,616,919 | 11/1971 | Feddern . |
| 3,669,883 | 6/1972 | Huckstedt et al. . |
| 3,719,278 | 3/1973 | Kolfertz . |
| 3,772,192 | 11/1973 | Huckstedt et al. . |
| 3,834,541 | 9/1974 | Rundell . |
| 3,872,010 | 3/1975 | Nagahama . |
| 3,884,186 | 5/1975 | Hickey . |
| 3,965,007 | 6/1976 | Conn . |
| 3,993,563 | 11/1976 | Degner . |
| 3,994,811 | 11/1976 | Cohen et al. . |
| 4,187,088 | 2/1980 | Hodgson . |
| 4,246,013 | 1/1981 | Truhan et al. . |
| 4,272,372 | 6/1981 | Fonseca . |
| 4,333,829 | 6/1982 | Walther . |
| 4,746,440 | 5/1988 | Seeger . |
| 4,764,311 | 8/1988 | Klaes . |
| 4,834,872 | 5/1989 | Overath . |
| 4,959,183 | 9/1990 | Jameson . |
| 4,988,436 | 1/1991 | Cole . |
| 5,078,867 | 1/1992 | Danner . |
| 5,122,267 | 6/1992 | Giovanetti et al. . |
| 5,139,659 | 8/1992 | Scott . |
| 5,234,581 | 8/1993 | Rosenberg . |
| 5,282,962 | 2/1994 | Chen . |
| 5,348,648 | 9/1994 | Hamdan . |
| 5,380,160 | 1/1995 | Chen . |

FOREIGN PATENT DOCUMENTS

| | | |
|---|---|---|
| 275365 | 8/1964 | Australia . |
| 1554378 | 1/1969 | France . |
| 2371968 | 11/1976 | France . |
| 2539772 | 7/1984 | France . |
| 1146813 | 4/1963 | Germany . |
| 1289353 | 2/1969 | Germany . |
| 2907146 | 9/1979 | Germany . |
| 3035344 | 4/1982 | Germany . |
| 60-114332 | 6/1985 | Japan . |
| 4-310289 | 11/1992 | Japan . |
| 6512340 | 3/1966 | Netherlands . |
| 447371 | 12/1974 | U.S.S.R. . |

OTHER PUBLICATIONS

Water De-Oiling in an Air-Sparged Hydrocyclone, Filtration & Separation, Jul./Aug. 1983, pp. 279, 280 and 282.

*Primary Examiner*—Thomas M. Lithgow
*Attorney, Agent, or Firm*—Oblon, Spivak, McClelland, Maier & Neustadt, P.C.

[57] ABSTRACT

A foam fractionator which can create a vortex is utilized to remove proteins from an aquatic environment by skimming. The vortex is created by a propeller arrangement located at the bottom of an internal chamber, centrally located within a main reaction chamber. Air sucked from the atmosphere by the vortex passes down through a central chamber and is dispensed outwardly into the main chamber where air bubbles form and rise to the surface. The air bubbles attract protein deposits which stick thereto which results in the formation of a protein-containing surface foam that is collected within a collection cup.

11 Claims, 4 Drawing Sheets

FOAM FRACTIONATOR

BACKGROUND OF THE INVENTION

1. Field of the Invention

The present invention relates to a foam fractionator such as a vortex foam fractionator which removes proteins from an aquatic environment by skimming. In the apparatus of the present invention, a vortex is created by propeller means located at the bottom of an internal chamber, centrally located within a main reaction chamber. Air sucked from the atmosphere by the vortex passes down through the central chamber and is dispensed outwardly into the main chamber where air bubbles form and rise to the surface. The air bubbles attract protein deposits which stick together resulting in the formation of a protein containing surface foam which is collected within a collection cup. The propeller means include a first propeller positioned within a central tube which forms an air vortex, and a second propeller which pumps air into descending water flow passing over an upper edge of the central pump tube.

2. Discussion of the Background

Filtration methods are utilized in both aquaculture and aquaristics and permit a user to keep a water quality level sufficiently high so as to duplicate an aquatic ecosystem and even achieve the reproduction of some species in captivity. These filtration methods can be divided into three general groups depending on their function. A first group involves mechanical filters which are used in many water filtration systems and function to trap and retain water-borne particles inside a media that can be discarded or washed and re-used once it is saturated. Examples of mechanical filters involve floss, sponges, sand filters and sub-micronic filters.

A second group of filtering systems is a biological-type filtering system. Since bacterial action occurs on all ecosystems to degrade organic and inorganic matter to less complex by-products and create in the process a more adequate environment for higher forms of life, several methods of water purification that utilize bacterial colonies to bio-degrade other animals' waste have been developed. During this process, a delicate balance is achieved inside an artificial environment. Biological filters create a symbiotic relation between bacteria and the rest of the organisms that inhabit the system. An example of biological filter devices are under-gravel plates, wet/dry systems, etc.

A third group of filters involves chemical filters. These filters can basically absorb impurities dissolved in water and retain them inside a media. Chemical filters are not the same as mechanical filters which just absorb particles, chemical filters use electrochemical force to attract the impurities to themselves. Examples of chemical filters include activated carbon, de-ionizers, molecular absorption media and protein skimmers.

Protein skimmers basically involve three types of processes. These processes include a co-current protein skimmer, a counter-current protein skimmer and a venturi protein skimmer. These protein skimmers basically use the concept of mixing air with water to achieve a skimming action. That is, a protein skimmer is a chemical filtering device that works by using air bubbles for water purification.

In an artificial aquatic environment organic compounds, proteins among them, accumulate by the metabolic waste of animals and plants, the slow decay of matter, and the addition of food to the system. In nature, these compounds are bio-degraded, and utilized also by plants for their own metabolism. In a closed artificial environment, it is difficult to prevent an accumulation of organic compounds capable of damaging the closed environment. As a result, partial water changes are needed to perform and maintain adequate water conditions. Even though bacterial action in plants can take care of much of the work to keep an aquarium system healthy, water changes are necessary nevertheless because bacteria and plants also produce their own waste that, although it is much less toxic to higher organisms, needs to be removed periodically.

Conventional protein skimmers have drawbacks in that they do not adequately prevent the buildup of waste including bacterial by-products in water that could be detrimental to the well being of a delicate organism and adversely affects the quality of the water.

SUMMARY OF THE INVENTION

An object of the present invention is to provide for an improved foam fractionator that works by utilizing air bubbles for water purification.

The fractionator of the present invention is capable of extracting organic compounds from an aquatic environment before they are attacked by bacterial action. This raises the quality of the system's water and prevents buildup of waste, including bacterial by-products, that could be detrimental to the well-being of delicate organisms. This also raises the dissolved oxygen in the water and by eliminating most of the bacterial intervention in the water management process which consumes plenty of oxygen, the concentration of this gas will go up.

In an aquatic system, organic molecules that dissolve in water generally have two extremes, one hydrophilic (attracted to water) and one hydrophobic (repels water). This characteristic makes these molecules rise to the interface of a water column. They are like little buoys that float with the hydrophilic side facing down to the water and the hydrophobic side facing toward the atmosphere. This type of molecule is known as a surfactant.

The fractionator of the present invention works by constantly mixing water and air inside a chamber. The water that is introduced into the chamber comes from the main system and as air is injected, surfactants will adhere to the wall of the air bubble to create a skin over it. The skin forms because the hydrophobic side of the surfactants will be attracted to the surface of the bubble by electrochemical forces. Eventually, the air bubbles injected inside the chamber will saturate with surfactants and will start overflowing inside a collecting cup.

The foam fractionator of the present invention provides for an improved filtration apparatus which utilizes a vortex inside a reaction chamber to achieve a skimming process. The foam fractionator involves the use of a motor, shaft, propellers, a plurality of reaction chambers, an air distributor and a collecting cup. A water pump is utilized to introduce water to the main reaction chamber and the motor can be located on the top of the unit so as to be attached to a shaft which turns the propellers.

The foam fractionator of the present invention comprises an outer casing adapted to receive water therein, the outer casing comprising a first opening for inserting a water inlet tube therethrough; an inner casing mounted within the outer casing, with the inner casing having a second opening for receiving the water inlet tube inserted through the first opening of the outer casing; a hollow member which extends through the inner casing, the hollow member comprising an air distributor at a bottom portion thereof and an air inlet located at a top portion of the hollow member; a rotatable shaft which extends through the hollow member; a first propeller mounted on a lower end of the shaft and positioned at a bottom portion of the inner casing; and a second propeller mounted at the lower end of the shaft at a position below the first propeller, the second propeller being located below a lower end of the inner casing.

In the present invention, a rotation of the shaft causes a rotation of the first and second propellers, with the rotation of the first propeller drawing air into the hollow member through the air inlet such that the drawn-in air is led from the hollow member into at least the inner casing through the air distributor. The air led into the inner casing through the air distributor is mixed with water in the inner casing which is supplied to the inner casing through the water inlet to form an air/water mixture which rises inside the inner casing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
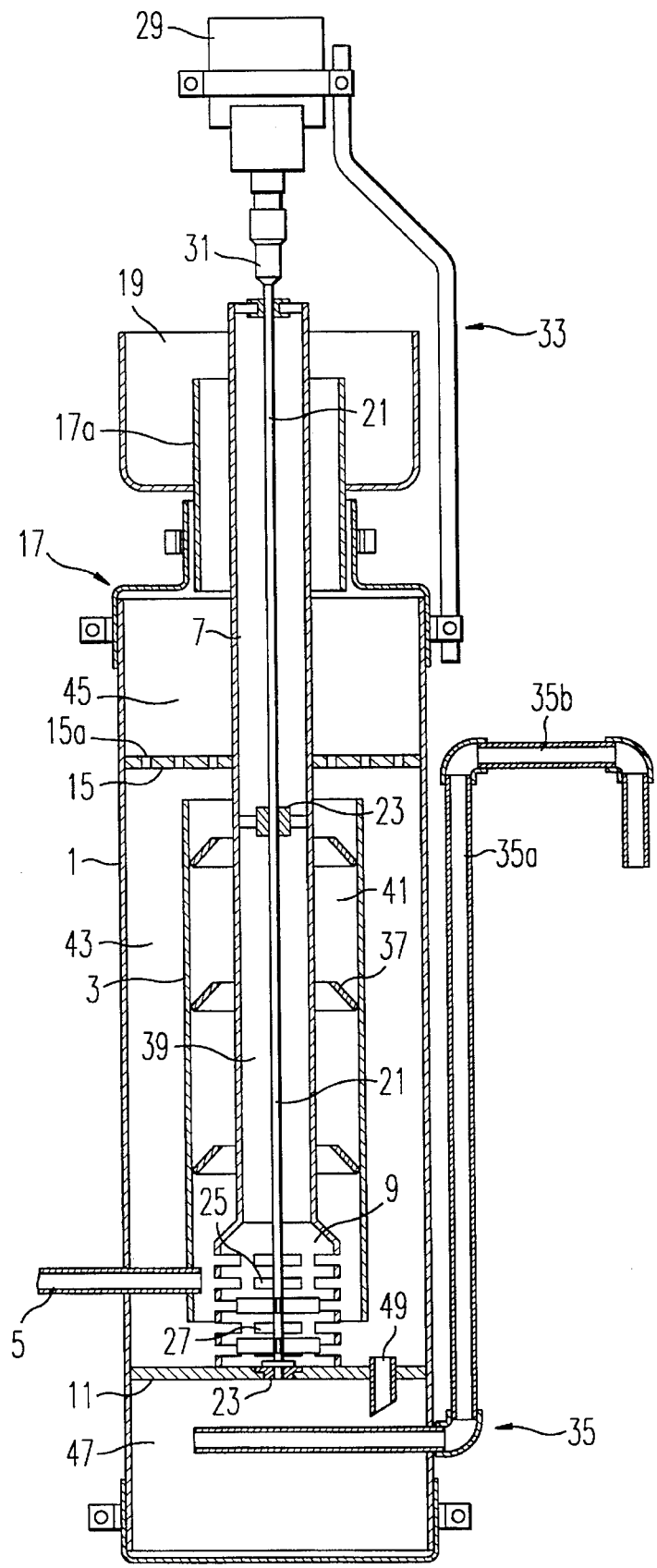
FIG. 1 illustrates the foam fractionator of the present invention.
Figure 2:
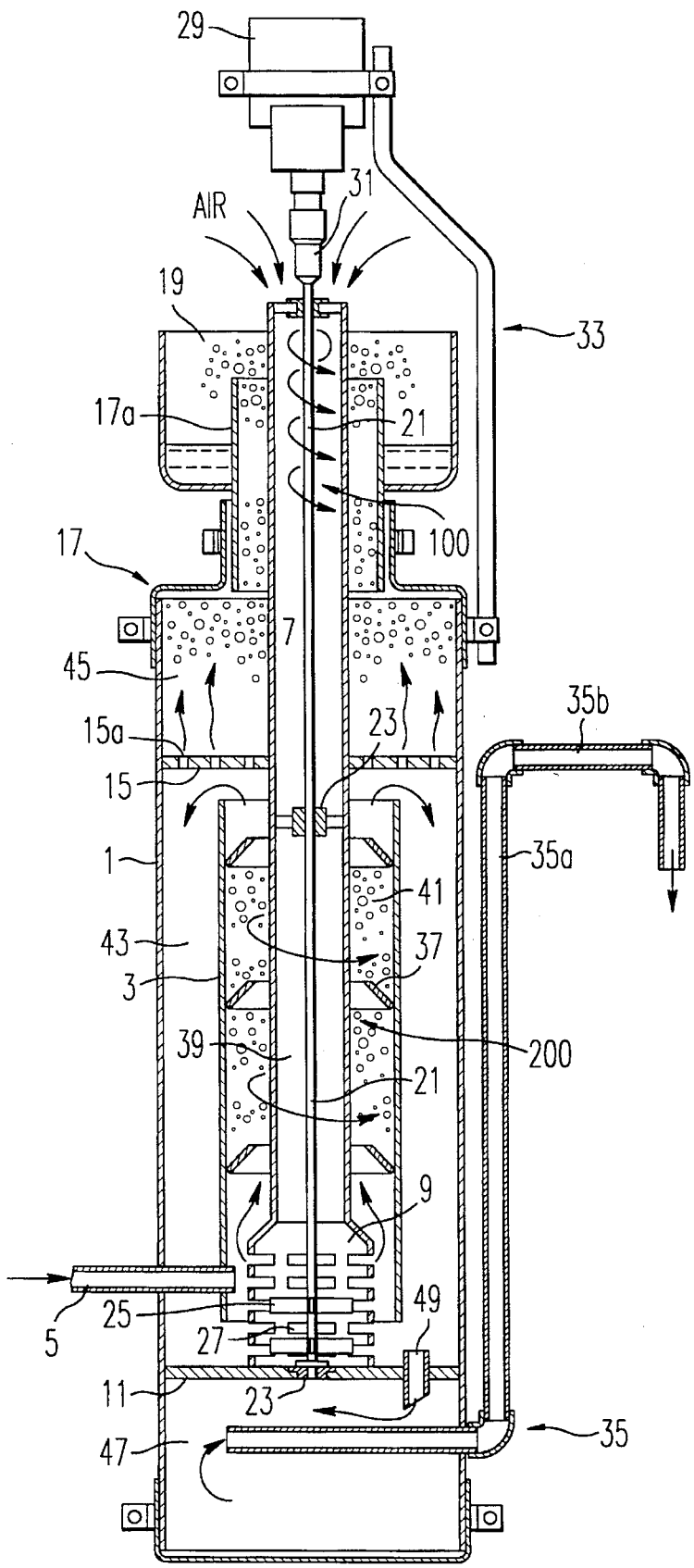
FIG. 2 illustrates the foam fractionator of FIG. 1 including a water flow therein.

Referring now to the drawings, wherein like reference numerals designate identical or corresponding parts throughout the several views, and more particularly to FIGS. 1 and 2 thereof, these figures illustrate the foam fractionator of the present invention. The foam fractionator constantly mixes water and air inside a chamber. FIGS. 1 and 2 illustrate an outer casing 1 and an inner casing 3 mounted within the outer casing 1. The outer casing 1 includes a water inlet 5 which leads into the inner casing 3. As illustrated in the figures, the outer casing 1 is adapted to receive water therein. Positioned within the inner casing 3 is a hollow member 7. As illustrated in FIG. 1, the hollow member 7 extends through a top opening of the outer casing 1 and through the inner casing 3. At a lower end of the hollow member 7 an 10 air distributor 9 is positioned. The hollow member/air distributor arrangement (7, 9) is mounted on a lower plate 11 which is positioned on the outer casing 1. The outer casing 1 also includes an upper perforated plate 15 including perforations 15a and having an opening through which the hollow member 7 extends through.

The outer casing 1 can also include a cover 17 and an extended portion 17a which extends from the cover. A collection cup 19 can be positioned over the extended portion 17a of the outer casing 1.

As illustrated in FIGS. 1 and 2, the hollow member 7 extends beyond the top of the collection cup 19. A rotatable shaft 21 extends longitudinally through the hollow member 7 and can be rotatably supported through for example bushings 23 within the hollow member 7.

Figure 3:
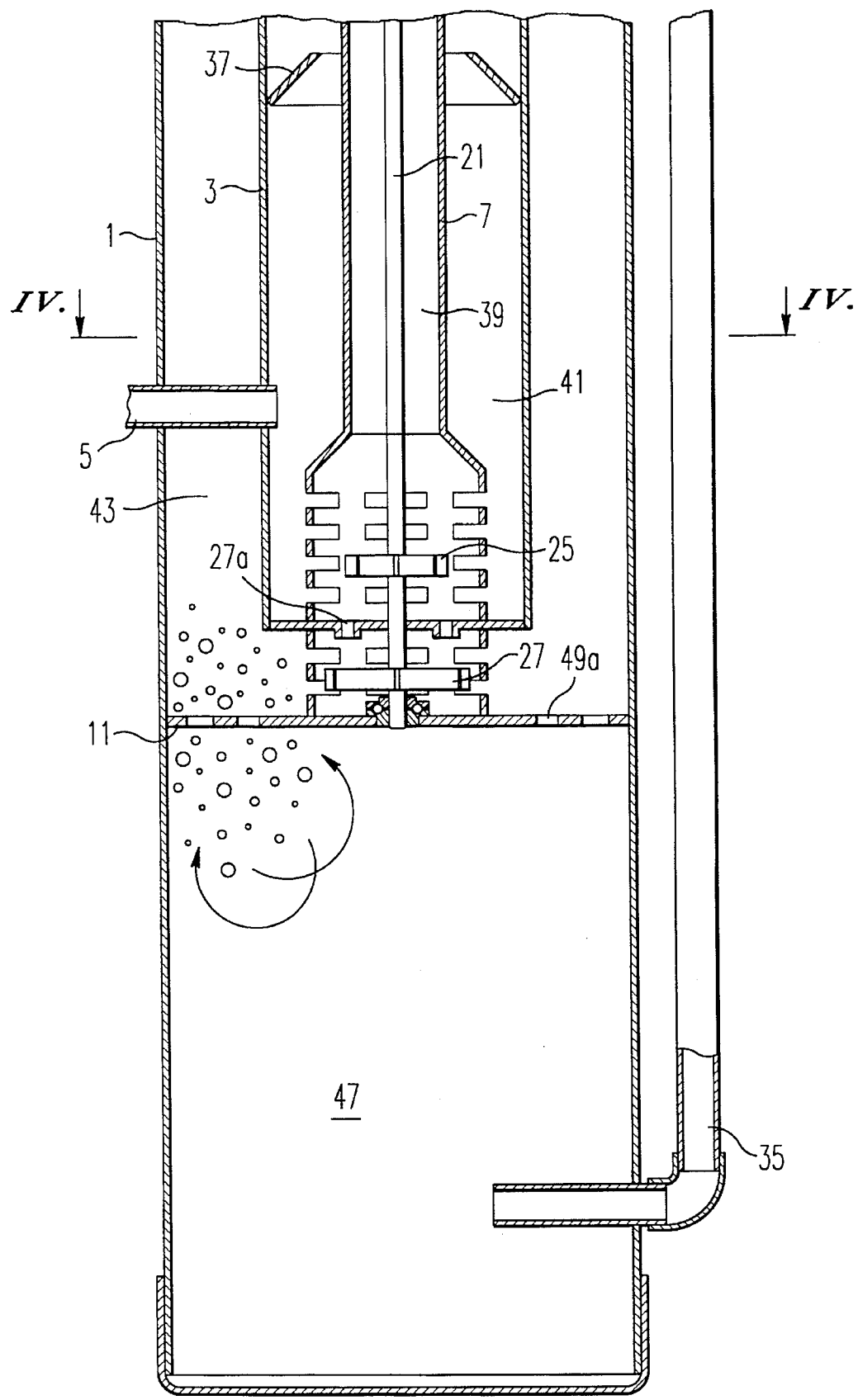
FIG. 3 is a detailed view of a lower portion of the foam fractionator of the present invention.

At the lower end of the rotatable shaft 21, first and second propellers 25 and 27 are positioned. The first propeller 25 is an upper propeller and is positioned within the air distributor 9 at a lower end of the inner casing 3. The second propeller 27 is a lower propeller and is positioned within a portion of the air distributor 9 that extends below the inner casing 3. FIG. 3 shows an air inlet 27a to the lower propeller 27.

A motor 29 or other type of moving mechanism can be positioned on the top portion of the rotatable shaft 21 by means of a chuck 31 as illustrated in FIGS. 1 and 2. The motor 29 can be mounted to the outer casing 1 by means of a mounting mechanism 33 as illustrated in FIGS. 1 and 2.

The foam fractionator of FIG. 1 further can include a water outlet 35 which can be located at a lower end of the outer casing and includes outlet pipes 35a and 35b as illustrated in FIG. 1.

Positioned within the inner casing 3 are baffle plates or restrainers 37. As illustrated in the drawings, the baffle plates 37 extend from an inner periphery of the inner casing 3 toward an outer periphery of the hollow member 7. A space is maintained between an inner end of the baffle plates 37 and an outer surface of the hollow member 7 so as to permit water and air to pass therethrough. The baffle plates 37 can be inclined or have a cone shape as illustrated in the FIGS. 1 and 2 and can be positioned at intervals along a longitudinal direction of the hollow member 7 and inner casing 3 as illustrated in the drawings.

In the foam fractionator illustrated in FIGS. 1 and 2, a first chamber 39 is defined within the hollow member 7; a second chamber 41 is defined in the space defined by the inner casing 3; a third chamber 43 is defined by the space between the inner casing 3 and the outer casing 1; a fourth chamber 45 is defined by the top of the outer casing 1 and the upper perforated plate 15; and a fifth chamber 47 is defined by the lower end of the outer casing 1 and the lower plate 11.

As illustrated in FIGS. 1 and 2, the water outlet 35 can be positioned within the lower chamber 47. Also, the lower plate 11 can include a fifth chamber inlet 49 or perforations 49a (see FIGS. 3 and 4) for communicating the third chamber 43 and the fifth chamber 47.

Operation of the present invention will now be described with reference to FIG. 2. To start operation, the motor 29 is activated so as to turn the shaft 21 and thereby rotate the upper and lower propellers 25 and 27. Once the propellers 25 and 27 are rotating, the upper propeller 25 will create a vortex 100 that will suck air from the atmosphere into the first chamber 39 defined by the hollow member 7. As contact is made between the upper propeller 25 and the incoming air, the incoming air will be broken and dispersed by the air distributor 9. Due to the action of the upper propeller 25, water which is introduced into the outer casing 3 by way of the water inlet 5 and is already inside the inner casing 3, will mix with the air. Therefore, water from the system to be filtered will enter through the water inlet 5 directly into the inner casing 3 where it is received by the vortex action created by the upper propeller 25. As water mixes with air, it starts to rise inside the secondary chamber 41 and will attract matter in the water. It is noted that the movement of the air and water is illustrated by arrows in FIG. 2 (such as, for example, in the form of a foam vortex 200).

Once the air/water mixture leaves the secondary chamber 41, the air will pass to the fourth chamber 45 with accumulated matter and the water will go down due to the action of gravity as further illustrated by the arrows in FIG. 2. The lower propellers 27 create a counter-current effect which will be achieved by a second vortex. As described above, the lower propeller 27 is attached to the lower end of the shaft 21 within a portion of the air distributor 9 which extends below the inner casing 3. The lower propeller 27 creates an action which is simultaneous but separate from the action created by the upper propeller 25. That is, the upper propeller 25 aerates the second chamber 41, while the lower propeller 27 aerates the third chamber 43. Air reaches the second propeller 27 by drawing air from the distributor through a bushing located at the bottom of the inner casing 3 or through specially located perforations 27a. This operation makes the unit twice as effective because it permits the water to be skimmed twice before returning to the main system, to prevent any re-incorporation of unskimmed matter, during a first fractionating stage, into the returning water flow.

To further improve the contact time between the air and water, as noted above, the inner casing 3 includes the baffles or restrainers 37. The restrainers are positioned on an inner periphery of the inner casing 3 and extend to but do not touch an outer periphery of the hollow member 7. The space between the inner end of the baffle plates and the outer periphery of the hollow member 7 enables the air/water mixture to rise at a slow rate within the inner casing 3. The swirling effect created by the upper propeller 25 will be promulgated by these restrainers, to increase the contact between the incoming water and the drawn-in air. Since the action inside the secondary chamber 41 is not a counter-current action, incorporation of several restrainers 37 as illustrated in FIGS. 1 and 2 will help achieve the desired restraining effect.

Therefore, once the rising air/water mixture reaches the top of the inner casing 3, a portion of the air/water mixture rising into the fourth chamber 45 will cause a foam created by the air/water mixture to rise and be finally collected in the collection cup 19.

Figure 4:
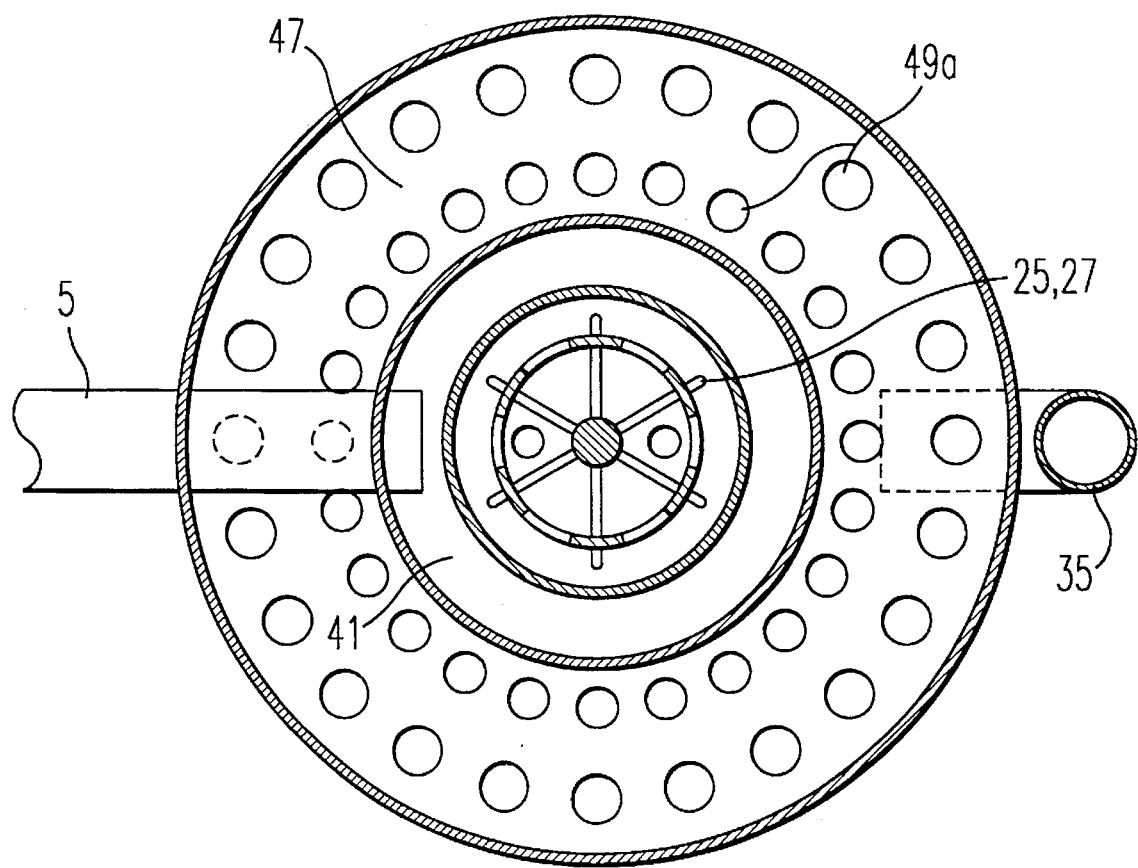
FIG. 4 is a view of a lower end of the foam fractionator of the present invention.

With regard to the propellers 25 and 27, as illustrated in FIGS. 3 and 4, the propellers 25 and 27 can be blade turbine type propellers having straight vanes that can form a 90-degree angle with the lower end of the casing. The blades are designed to operate at very high speeds and are designed to draw air from the top as explained above and properly mix the air with the incoming liquid. The blades are also designed to displace the air sideways away from the center of the first chamber so as to increase the contact time of the water/air mixture. The blades are also designed to minimize any axial flow patterns so as to help achieve the desired sideways flow of air which is drawn in from the top.

The combination of the propellers 25, 27, restraining devices 37 and chambers 39, 41, 43, 45 and 47 of the present invention create a proper air/water mixture to achieve the desired filtering of water in the system. That is, the apparatus of the present invention creates the proper air/water bubble size in the air/water mixture which is important for waste water treatment. Applicant notes that if the air bubble size is too small, the air bubble will not be able to float enough to reach the collecting cup 19. If, on the contrary, the air bubbles are too large, they rise to the surface too fast and the surfactants will not have enough time to stick to the bubble surface. Applicant further notes that a recommended bubble average size is about 0.8 mm to maximize the performance of the unit of the present invention.

The present invention also provides for a desired air-water relation. That is, there must be a proper relation between the amount of water entering the chamber and the amount of air injected. If too much air is injected, then the foam collected inside the cup 19 will be excessively wet. If too little air is injected, then the skimming process will be extremely slow and ineffective.

Additionally, the present invention achieves a desired contact time between the air bubbles and the water. Presuming that the air bubble size and air/water relation are satisfactory, then the contact time should be lengthened as much as possible. In this way, the air bubbles will be covered with surfactants until saturation.

The apparatus of the present invention as described above including the restrainers and propellers achieves the desired air bubble size, air/water relation and contact time for permitting an efficient filtering of a water system.

The apparatus of the present invention is capable of preventing the introduction of fine air bubbles since it is important to prevent these fine air bubbles from entering into the main system. This is particularly important in systems that house marine invertebrates, specifically corals, since air bubbles can, and will, lodge in their tissue. If this air is not removed, the animal's tissue will slowly recede to expose the skeleton until it dies. As air is broken by the propeller inside the unit, the size of some bubbles may be too small so as not to create a strong buoyancy. This may enable outcoming water to carry them right out of the unit. The utilization of the lower plate 11 and fifth chamber 47 of the present invention creates a longer path of resistance to the bubbles that wears the outcoming water's momentum so as to reduce any air leakage to the main system.

With regard to the fifth chamber 47, as noted above, this chamber is useful in preventing water to quickly flow back into the system. The fifth chamber 47 creates a path of resistance to bubbles which are too small to rise within the inner casing 3. The length of the fifth chamber 47 is based on design considerations and can be longer than that illustrated in the drawings. The lower plate 11 can include a number of perforations 49a and the fifth chamber 47 can have a length which is long enough to prevent fine air bubbles with weak buoyancies to enter the main system. Therefore, the air bubble concentration would be higher in the upper part of the fifth chamber 47. Thus, the fifth chamber 47 acts as a resistance path that will decrease the water's velocity around the area of highest air concentration to allow the bubbles to rise more easily. It is noted that the effectiveness of the fifth chamber 47 can also be increased by filling it with inner sponge material so as to trap any fine bubbles which enter the fifth chamber.

Thus, the present invention provides for a foam fractionator which creates a vortex and works as a protein skimmer which is designed to work with, for example, salt water aquarium systems. The apparatus of the present invention can produce a great number of appropriately sized air bubbles with an equally appropriate surface area. Organic materials that dissolve in water as noted above can have hydrophilic (water attracting) and hydrophobic (water repelling) features. The foam fractionator of the present invention mixes water with air inside a chamber such that the water introduced into the chamber that comes from the main system and air which is injected into the main system will cause formation of bubbles such that the surfactants will adhere to the bubbles. These air bubbles which will upwardly flow within the system will saturate with the surfactants and overflow inside a collecting cup.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A foam fractionator comprising:

an outer tubular casing adapted to receive water therein, said outer casing comprising a first opening for inserting a water inlet tube therethrough;

an inner tubular casing mounted within said outer casing, said inner casing having a second opening for receiving the water inlet tube inserted through said first opening of the outer casing, said inner tubular casing being smaller than said outer tubular casing so as to define a space there between;

a hollow tubular member which extends through said inner casing, said hollow member comprising an air distributor at a bottom portion thereof, and an air inlet is located at a top portion of said hollow member;

a rotatable shaft which extends through said hollow member;

a first propeller mounted on a lower end of the shaft and positioned at a bottom portion of said inner casing; and a second propeller mounted at the lower end of the shaft at a position below said first propeller, said second propeller being located below a lower end of said inner casing;

means for receiving foam mounted at a vicinity of a top portion of the outer casing;

wherein a rotation of said shaft causes a rotation of said first and second propellers, said rotation of the first propeller drawing air into said hollow member through said air inlet such that the drawn-in air is led from said hollow member into at least said inner casing through said air distributor, the air led into said inner casing through said air distributor being mixed with water in said inner casing which is supplied to said inner casing through said water inlet to form an air/water mixture which rises inside the inner casing.

2. A fractionator according to claim 1, further comprising:

an upper perforated plate positioned in said outer casing above said inner casing, wherein the air/water mixture rising in said inner casing passes through said upper perforated plate and is collected in a collection cup which is mounted at a vicinity of a top portion of the outer casing.

3. A fractionator according to claim 1, wherein said inner casing comprises a plurality of baffle plates which extend from an inner wall of the inner casing toward the hollow member, wherein a space is maintained between an inner end of said baffle plates and an outer surface of said hollow member, said baffle plates being mounted at intervals along a longitudinal direction of said hollow member so as to lower a rising rate of the air/water mixture.

4. A fractionator according to claim 1, wherein the first and second propellers are positioned within the air distributor of the hollow member.

5. A fractionator according to claim 4, wherein a lower end of said air distributor extends through a bottom portion of said inner casing and said air distributor is mounted on a lower plate mounted on said outer casing.

6. A fractionator according to claim 5, wherein said lower plate is a perforated plate.

7. A fractionator according to claim 5, wherein the lower plate comprises an opening.

8. A fractionator according to claim 5, wherein a lower chamber is defined between the lower plate and a bottom end of the outer casing, the lower chamber comprising a water outlet tube.

9. A fractionator according to claim 1, wherein an upper perforated plate and a top end of the outer casing define an upper chamber which receives the air/water mixture, wherein water which does not pass through said upper perforated plate is drawn downward within said space defined between said inner casing and said outer casing by gravity.

10. A fractionator according to claim 4, wherein said lower propeller draws air into a space defined between said outer casing and said inner casing.

11. A fractionator according to claim 1, wherein a motor is operatively connected to said rotatable shaft for rotating said shaft.

* * * * *